(12) United States Patent
Sundaresan et al.

(10) Patent No.: US 9,135,503 B2
(45) Date of Patent: Sep. 15, 2015

(54) FINGERTIP TRACKING FOR TOUCHLESS USER INTERFACE

(75) Inventors: Sairam Sundaresan, San Diego, CA (US); Ning Bi, San Diego, CA (US); Milivoje Aleksic, San Diego, CA (US); Yingyong Qi, San Diego, CA (US); Xuerui Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 13/082,295

(22) Filed: Apr. 7, 2011

(65) Prior Publication Data

US 2012/0113241 A1 May 10, 2012

Related U.S. Application Data

(60) Provisional application No. 61/411,853, filed on Nov. 9, 2010.

(51) Int. Cl.
*G06F 3/033* (2013.01)
*G06K 9/00* (2006.01)
*G06F 3/01* (2006.01)
*G06T 7/20* (2006.01)

(52) U.S. Cl.
CPC ............ *G06K 9/00375* (2013.01); *G06F 3/017* (2013.01); *G06K 9/00006* (2013.01); *G06K 9/00355* (2013.01); *G06T 7/2046* (2013.01); *G06T 2207/30196* (2013.01)

(58) Field of Classification Search
CPC . G06K 9/00006; G06K 9/00355; G06F 3/017
USPC ................. 715/863; 382/203; 348/77
See application file for complete search history.

(56) References Cited

U.S. PATENT DOCUMENTS

| 5,548,667 | A | 8/1996 | Tu |
| 6,624,833 | B1 | 9/2003 | Kumar et al. |
| 8,654,219 | B2 * | 2/2014 | Im et al. ................. 348/246 |
| 8,693,724 | B2 * | 4/2014 | Ahmed et al. ............ 382/103 |
| 8,723,789 | B1 * | 5/2014 | Rafii ....................... 345/156 |
| 8,970,479 | B1 * | 3/2015 | Chang et al. ............. 345/156 |
| 2005/0271279 | A1 * | 12/2005 | Fujimura et al. .......... 382/203 |

(Continued)

OTHER PUBLICATIONS

Achilleas Anagnostopoulos et al: "A realtime mixed reality system for seamless interaction between real and virtual objects", Proceedings of the 3rd International Conference on Digital Interactive Media in Entertainment and Arts, DIMEA '08, Sep. 10, 2008 (Sep. 10, 2008), XP55017328, New York, New York, USA DOI: 10.1145/1413634.1413673 ISBN: 978-160-558248-1.

(Continued)

*Primary Examiner* — Helen Shibru
(74) *Attorney, Agent, or Firm* — Brent Boyd

(57) ABSTRACT

In general, this disclosure describes techniques for providing a gesture-based user interface. For example, according to some aspects of the disclosure, a user interface generally includes a camera and a computing device that identifies and tracks the motion of one or more fingertips of a user. In some examples, the user interface is configured to identify predefined gestures (e.g., patterns of motion) associated with certain motions of the user's fingertips. In another example, the user interface is configured to identify hand postures (e.g., patterns of showing up of fingertips). Accordingly, the user can interact with the computing device by performing the gestures.

36 Claims, 11 Drawing Sheets

(56) References Cited

U.S. PATENT DOCUMENTS

| 2009/0077504 | A1 | 3/2009 | Bell et al. | |
|---|---|---|---|---|
| 2011/0074675 | A1* | 3/2011 | Shiming et al. | 345/158 |
| 2011/0175837 | A1* | 7/2011 | Westerman et al. | 345/173 |
| 2012/0268376 | A1* | 10/2012 | Bi | 345/168 |

OTHER PUBLICATIONS

Byung-Kuk Seo et al: "One-handed interaction with augmented virtual objects on mobile devices", Proceedings of the 7th ACM SIGGRAPH International Conference on Virtual-Reality Continuum and Its Applications in Industry, VRCAI '08, Dec. 8, 2008 (Dec. 8, 2008), p. 1, XP55017332, New York, New York, USA DOI: 10.1145/1477862.1477873 ISBN: 978-1-60-558335-8.

Costanzo C et al: "Virtual board: real-time visual gesture recognition for natural human-computer interaction", Parallel and Distributed Processing Symposium, 2003. Proceedings. International Apr. 22-26, 2003, Piscataway, NJ, USA,IEEE, Apr. 22, 2003 (Apr. 22, 2003), pp. 112-119, XP010645651, ISBN: 978-0-7695-1926-5.

Duda R O et al: "Pattern Classification, Unsupervised Learning and Clustering", Dec. 31, 2001 (Dec. 31, 2001), Pattern Classification, New York, John Wiley & Sons, US, p. 517-528, XP002601045, ISBN: 978-0-471-05669-0.

Hongwei Ying et al: "Fingertip detection and tracking using 2D and 3D information", Intelligent Control and Automation, 2008.WCICA 2008. 7th World Congress on, IEEE, Piscataway, NJ, USA, Jun. 25, 2008 (Jun. 25, 2008), pp. 1149-1152, XP031301051, ISBN: 978-1-4244-2113-8.

International Search Report and Written Opinion—PCT/US2011/059451—ISA/EPO—Mar. 21, 2012.

Shahzad Malik: "Real-time Hand Tracking and Finger Tracking for Interaction", Dec. 18, 2003 (Dec. 18, 2003), XP55017330, DOI: 10.1.1.135.1334, Retrieved from the Internet: URL:http://citeseerx.ist.psu.edu/viewdoc/s 30-32,36 ummary"doi="doi=10.1.1.135.1334 [retrieved on Jan. 24, 2012].

Xiong W et al: "Model-guided deformable hand shape recognition without positioning aids", Pattern Recognition, Elsevier, GB, vol .38, No. 10, Oct. 1, 2005 (Oct. 1, 2005), pp. 1651-1664, XP004988746, ISSN: 0031-3203, DOI: 10.1016/J.PATCOG.2004.12.003.

Yannick Verdie et al: "MirrorTrack—Tracking with Reflection—Comparison with Top-Down Approach", ICMI-MLMI'09, Nov. 2, 2009 (Nov. 2, 2009), pp. 347-350, XP55017334.

Argyros et al., "Vision based interpretation of hand gestures for remote control of a computer mouse, Computer Vision for Human-Computer Interaction," pp. 40-51, 2006.

Baudel et al., "Charade:Remote control of objects using free-hand gestures," CACM, vol. 36, No. 7, pp. 28-35, 1993.

Kjeldsen et al., "Finding skin in color images," Proc. International Conference on Automatic Face and Gesture Recognition, pp. 312-317, Oct. 1996.

Kjeldsen et al., "Towards the use of Gesture in Traditional User Interfaces," Proc. International Conference on Automatic Face and Gesture Recognition, pp. 151-156, Oct. 1996.

Kolsch et al., "Fast 2D hand tracking with flocks of features and multi-cue integration," Vision for Human-Computer Interaction, pp. 158, 2004.

Kurata et al., "The hand mouse: GMM hand-color classification and mean shift tracking," International Workshop on Recognition, Analysis and Tracking of Faces and Gestures in Real-time Systems, 2001, 6 pp.

Lee et al., "Markerless Inspection of Augmented Reality Objects Using Fingertip Tracking," International Symposium on Wearable Computers, Oct. 2007, 8 pp.

Letessier et al., "Visual Tracking of Bare Fingers for Interactive Surfaces," Proc. ACM Symposium on User Interface Software and Technology, Interactive Surfaces, pp. 119-122, 2004.

Maggioni, "GestureComputer—New Ways of Operating a Computer," Proc. International Conference on Automatic Face and Gesture Recognition, pp. 166-171, Jun. 1995.

Malik et al., "Visual TouchPad: A two-handed gestural input device," Proc. ICMI, pp. 289-296, 2004.

Oka et al., "Real-time Fingertip tracking and gesture recognition," IEEE Computer Graphics and Applications, 22(6), pp. 64-71, 2002.

Rehg et al., "Visual Tracking of High DOF Articulated Structures: An Appolation to Human Hand Tracking," Proc. European Conference on Computer Vision, pp. 35-46, May 1994.

Segen et al., "Human-Computer Interaction using Gesture Recognition and 3D Hand Tracking," Proc. ICIP, Chicago, pp. 182-192, 1998.

Surachai Ongkittikul, et al., "Enhanced Hand Tracking using the K-means Embedded Particle Filter with Mean-Shift vector Re-sampling", VIE 08—The Institution of Engineering and Technology, 2008, pp. 23-28.

The OpenCV Blob extraction library, http://opencv.willowgarage.com/wiki/cvBlobsLib, last edited Aug. 1, 2009, 5 pp.

Wang Xi-Ying, et al., "An Approach to Tracking Deformable Hand Gesture for Real-Time Interaction", Journal of Software, vol. 18, No. 10, Oct. 2007, pp. 11.

Wu et al., "A Virtual 3D blackboard: 3D finger tracking using a single camera," International Conference on Automatic Face and Gesture Recognition, Grenoble, France, Mar. 2000, 8 pp.

* cited by examiner

FINGERTIP TRACKING FOR TOUCHLESS USER INTERFACE

This application claims the benefit of U.S. Provisional Application No. 61/411,853, filed Nov. 9, 2010, the entire content of each of which is expressly incorporated by reference herein.

TECHNICAL FIELD

The disclosure relates to user interfaces and, more specifically, touchless user interfaces that allow a user to interact with a device without physical contact.

BACKGROUND

Electronic devices, such as computers, mobile phones, personal media players (PMP), gaming consoles, or other electronic device require a user interface for a user to interact with the device. Some examples of various media providing user interfaces include one or more buttons, pointing devices such as a trackball, a mouse, a joystick, a keypad, or other tactile input devices. Some user interfaces also include graphics that are presented to a user on a display screen (e.g., a graphical user interface (GUI)), and accept input via devices such as a keyboard and a pointing device.

SUMMARY

In general, this disclosure describes techniques for providing a gesture-based user interface. For example, according to some aspects of the disclosure, a user interface generally includes a camera and a computing device that identifies and tracks the motion of one or more fingertips of a user. In some examples, the user interface is configured to identify predefined gestures (e.g., patterns of motion) associated with certain motions of the user's fingertips. Accordingly, the user can interact with the system by performing the gestures.

In one example, the disclosure is related to a method that includes generating a set of points associated with curvatures of a hand in a video frame, and generating a set of candidate fingertips based on the set of points. The method also includes merging candidate fingertips based on an initial target value and a relative proximity of the candidate fingertips to one another, and designating one or more of the merged candidate fingertips as fingertips for tracking.

In another example, the disclosure is related to a computer program product that includes a computer-readable storage medium having stored thereon instructions that, when executed, cause a processor to generate a set of points associated with curvatures of a hand in a video frame. The instruction also case a processor to generate a set of candidate fingertips based on the set of points, merge candidate fingertips based on an initial target value and the relative proximity of the candidate fingertips, and designate one or more of the merged candidate fingertips as fingertips for tracking.

In another example, the disclosure is related to an apparatus that includes a video camera and a fingertip tracking module. The video camera captures video frames. The fingertip tracking module generates a set of points associated with curvatures of a hand in the video frame, and generates a set of candidate fingertips based on the set of points. The fingertip tracking module also merges candidate fingertips based on an initial target value and the relative proximity of the candidate fingertips, and designate one or more of the merged candidate fingertips as fingertips for tracking.

In another example, the disclosure is related to an apparatus that includes a means for generating a set of points associated with curvatures of a hand in a video frame, and a means for generating a set of candidate fingertips based on the set of points. The apparatus also includes a means for merging candidate fingertips based on an initial target value and the relative proximity of the candidate fingertips, and a means for designating one or more of the merged candidate fingertips as fingertips for tracking.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
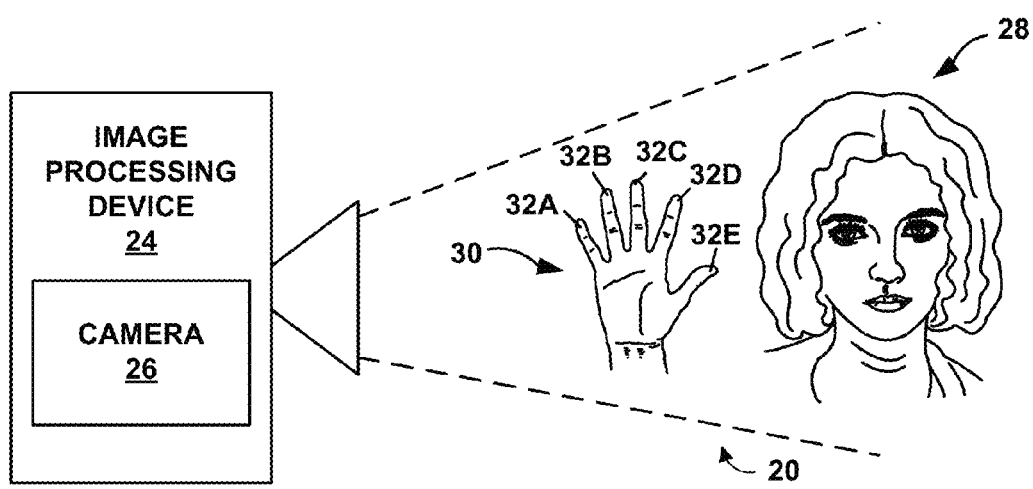
FIG. 1 is a diagram illustrating a user interacting with an image processing device, according to aspects of the present disclosure.

In general, techniques of this disclosure are related to a gesture-based user interface for a computing device. The user interface is "touchless," in that it does not require a user to physically contact the computing device in order to interact with the computing device. Rather, the user interface recognizes and tracks the motion of a user's hand using a camera. More specifically, according to some aspects of the disclosure, the user interface tracks the motions of the fingertips of a user's hand. As described herein, the term "fingertips" is intended to include the ends of each of four fingers, as well as the end of the thumb of a human or primate hand. The interface allows for interaction with the computing device that is easy and intuitive to use, and gives the user a more natural feeling of control, rather than using, for example, tactile input devices including a keyboard, mouse, and the like. For example, it may be more natural for a user to draw a diagram on a screen by waving a finger in front of the computing device, rather than using a mouse to carry out the same function. By tracking the fingertips of a user, the computing device can identify certain gestures that provide a convenient and natural way of interacting with the computing device.

According to some aspects of the disclosure, the user interface generally includes a camera and associated image processing device that identifies and tracks the motion of one or more fingertips of a user. In some examples, the system is configured to identify predefined gestures (e.g., patterns of motion) associated with certain motions of the user's fingertips. Accordingly, the user can interact with the system by performing the gestures. For example, the user may be able to drag, cut, copy, paste, open file, close file, open new window, browse, activate speech recognition, or interact in other ways with the computing system by performing gestures with their fingertips that are recognized by the system. The system may operate in real time and be user-independent, i.e., operable for multiple human users.

In some examples, the system focuses a camera on a user (e.g., a head, arm, and hand of a user). For a given frame that is captured by the camera, the system identifies the skin tone of the user and segments the skin areas of the frame from the other portions of the frame. The system then identifies the user's face and hand, and segments, or separates the face and hand from the rest of the frame. The system then removes the face from consideration, leaving only the hand for analysis. The system then identifies the fingertips of the hand. The system can repeat the process for each frame and track the fingertips in successive frames captured by the camera. In some examples, the system recognizes predefined gestures made by the user's fingertips and takes a corresponding action.

The system can identify and segment the skin of the user from a given frame using a variety of methods. In one example, the system compares pixels values of the frame to one or more histograms containing pixel values of known skin tones. For example, the system may compare pixel values of the frame to pixel values of histograms composed in a variety of different color spaces (e.g., red/green/blue (RGB), hue/saturation/value (HSV), or other color spaces). The system segments the skin of the user from the rest of the frame by determining a difference between pixel values of the frame and values of a histogram structure and comparing the difference to a threshold. If the difference is less than the tolerated threshold, that portion of the frame is segmented as skin. In another example, the system may rely on the user to complete a training process. For example, the system may prompt the user to perform a training process that trains the system to identify the user's skin tone. During the training process, the system may prompt the user to position the user's hand in a predetermined area, so that the system can identify the object in the area as the user's skin tone. The training process may be a one-time, initial procedure, or may be completed more than once during tracking. In another example, the system may utilize a face detection or recognition function to identify a face of the user. The system then identifies the skin areas of the face, and uses the skin areas of the face as a template for determining the skin tone of the user. For example, they system applies the tone of the skin areas of the face to the entire frame to segment the skin of the user from the rest of the frame.

After the system identifies and segments the user's skin, the system segments the face and arm of the user from the face. In examples in which the user's face, arm, and hand are included in the given frame, after segmentation of the skin there are two large regions of the frame that correspond to the face and the arm of the user. In such examples, the system may identify the two largest regions of the frame as the face and arm of the user (e.g., using an Open Source Computer Vision ("OpenCV") blob extraction library, for example, as included in OpenCV Version 2.2.0). In order to ensure that spurious background regions are not included, the system may implement a size-based elimination step prior to identifying the face and the arm of the user. For example, the system may have a predetermined minimum size threshold that must be exceeded prior to segmenting the two largest regions. The resulting frame contains only the segmented face and the hand, if present.

In some examples, the system then removes the face from consideration using face detection and/or the blob extraction. In one example, the system uses a face detection function on the original frame to determine the coordinates of the center of the user's face. The system then compares the center coordinates of the face to the segmented areas (e.g., the two largest blobs). The system removes the blob closest to the center coordinates of the face from consideration, leaving only the blob corresponding to the hand for further consideration.

After segmenting the hand, the system identifies and designates fingertips of the hand for tracking. In some examples, the system initially identifies candidate fingertip points. For example, the system first detects the contour of the hand. According to some aspects of the disclosure, the system detects highly curved areas of the contour of the hand using a K-curvature algorithm. The K-curvature algorithm produces a plurality of points associated with curvatures in the contour of the hand. The system then classifies each point from the algorithm as a peak or a valley. The peaks correspond to the tops of the fingertips of a user, while the valleys correspond to the low points, or webbing between a user's fingers. In some examples, the system verifies that a valley is positioned between peaks.

After identifying candidate fingertip points, the system clusters the points into groups based on proximity. According to some aspects of the disclosure, the system implements a K-means algorithm to cluster the points into groups. For example, the system uses the K-means algorithm to partition the dataset of points produced by the K-curvature algorithm into a set of K clusters. In some examples, the K-means algorithm includes a predetermined number of clusters as an input value. According to some aspects of the disclosure, the initial K value may be set to five (e.g., the system initially attempts to identify five fingers in a given frame).

In some examples, the system merges identified clusters that the system identifies as being too close together. For example, the system determines a distance between clusters identified by the K-means algorithm and compares the distance to a predefined distance threshold. If the clusters are not sufficiently spaced, the system merges the clusters together. The system then designates each cluster (or merged cluster) as a fingertip.

According to some aspects of the disclosure, the system may conduct an ellipse fitting operation, during which the system fits an elliptical shape to the designated fingertips. In some examples, the ellipse fitting operation can be used as a verification tool. For example, the natural contour of fingertips is roughly half-elliptical in shape. Accordingly, the merged clusters should include a number of points that follow a parabolic shape. In some examples, the system may apply a predefined elliptical shape to the points of the merged clusters to verify that the shape of the points is half-elliptical as expected. Points that do not follow the elliptical shape may be discarded as false positive designation of fingertips. In an embodiment, a least-squares approach is taken to fit the ellipse to the points of the merged clusters. After the ellipses have been fit, the system uses the center of the ellipses to further designate the fingertips.

The system can track the positions of fingertips in real time. For example, in one example implementation, the system can designate fingertips in frames having a 640×480 resolution at 17 frames per second, where every frame is analyzed. In other examples, the system may be configured to sample every "nth" frame at a higher frame rate (e.g., capture and process every other frame at a frame rate of 30 frames per second). Other frame resolutions and frame rates are also possible.

The system can interpret predefined gestures by tracking the relative positions of the various fingertips between successive frames. In some examples, the system is initialized and starts tracking the fingertips of a user when the user moves one or more fingers in front of the camera. The system can use the fingertip tracking capability for visualization tools as well as for moving virtual objects on the screen. For example, the system may identify gestures and take a computing action such as drag, cut, copy, paste, open file, close file, new window, browse, activate speech recognition, or other actions upon recognizing the gestures.

FIG. 1 is a diagram illustrating a user 20 interacting with an image processing device 24. In the example shown in FIG. 1, the image processing device 24 includes a camera 26 that is focused on a face 28 and a hand 30 of the user 20. Camera 26 of image processing device 24 may include a video capture device, such as a video camera. Camera 26 may be incorporated in image processing device 24 in a variety of ways. For example, camera 26 may be integrated in image processing device 24. In other examples, camera 26 may be an external camera that is in communication with image processing 24 via wired or wireless communication links.

According to an aspect of the disclosure, image processing device 24 and camera 26 may be incorporated into a mobile device, such as a mobile phone. In other examples, image processing device 24 and camera 26 may be incorporated in other wireless communication devices, personal digital assistants (PDAs), laptop computers, portable gaming devices, portable media players, e-book readers, watches, as well as non-portable devices such as desktop computers and gaming consoles. For purposes of illustration only in this disclosure, image processing device 24 and camera 26 may be described in conjunction with a portable or mobile device that a user can carry, but aspects of this disclosure should not be considered limited to portable or mobile devices.

According to some aspects of the disclosure, the image processing device 24 designates fingertips 32A-32E (collectively 32) of the hand 30 for tracking the motion of the fingertips 32. For example, for a given frame that is captured by camera 26, image processing device 24 identifies the skin tone of user 20 and segments the skin areas of the frame from the other portions of the frame. Image processing device 24 then identifies user's face 28 and hand 30, and segments, or separates face 28 and hand 30 from the rest of the frame. Image processing device 24 then removes face 28 from consideration, leaving only hand 30 for analysis. Image processing device 24 then designates fingertips 32 of hand 30 for tracking. Image processing device 24 repeats the processes for each frame in a succession of frames and tracks the motion of fingertips 32 throughout the succession of frames. For example, image processing device 24 determines the position of fingertips 32 for each frame and determines the difference in positions of fingertips 32 in successive frames.

In some examples, image processing device 24 identifies predefined gestures associated with certain motions of the user's fingertips 32. Accordingly, user 20 can interact with image processing device 24 by performing the gestures. For example, user 20 may perform a "pinching" gesture (e.g., bringing finger 32D and thumb 32E together in a pinching motion) to zoom in on content being displayed on image processing device 24. In another example, user 20 may point a single finger, such as finger 32D, and draw with the fingertip such that the image drawn by user 20 is displayed by image processing device 24. In other examples, user 20 may perform other gestures to interact with image processing 24 in other ways (e.g., enabling other functions of image processing device 24, such as a camera 26).

Figure 2:
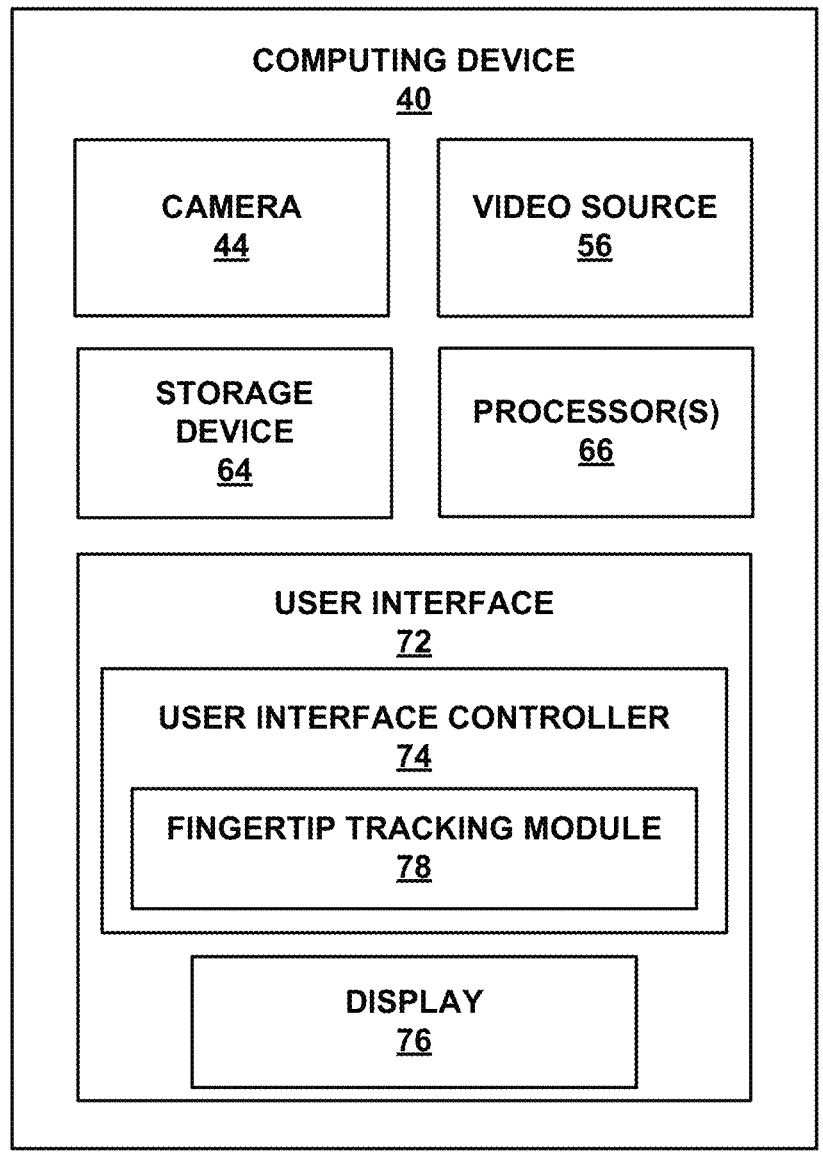
FIG. 2 is a block diagram illustrating an image processing device, according to aspects of the present disclosure.

FIG. 2 is a block diagram illustrating a computing device 40, which may be an example of image processing device 24 shown in FIG. 1. According to the example shown in FIG. 2, computing device 40 includes a camera 44, a video source 56 a storage device 64, and one or more processors 66. Computing device 40 also includes a user interface 72 having a user interface controller, 74, a display 76, and a fingertip tracking module 78.

In other examples, computing device 40 may include other components or arrangements. For example, according to some aspects of the disclosure, computing device 40 may be incorporated into mobile device, such as a mobile telephone that includes a microphone and speaker for voice communication. In other examples, computing device 40 may be incorporated in other wireless communication devices, personal digital assistants (PDAs), laptop computers, portable gaming devices, portable media players, e-book readers, watches, as well as non-portable devices such as desktop computers and gaming consoles. As such, computing device 40 may have more or fewer components than those shown in FIG. 2. For example, the computing device 40 may be incorporated into a gaming console, which may not include a video codec 48 or modem 52.

Camera 44 of computing device 40 may include an image and video capture device, such as a video camera. Camera 44 may be incorporated in computing device 40 in a variety of ways. For example, camera 44 may be a "front facing" camera that is positioned near display 76, such that camera 44 captures images of the user when the user is operating computing device 40. In other examples, camera 44 may be an external camera 44, such as an external camera that is in communication with computing device 40 via wired or wireless communication links.

Video source 56 of computing device 40 may generate computer graphics based on data as the source video, or a combination of live video, archived video, and computer generated video. According to some aspects of the disclosure, and as described in greater detail below, video source 56 and camera 44 may both generate video data to be displayed on display 76. In an example, camera 44 may capture images of a user to be displayed on display 76, while video source 56 may generate a computer generated graphic (e.g., a cursor) to be displayed on display 76.

Storage device 64 may include instructions that cause a processor 66 to perform various functions ascribed to processor 66 in this disclosure. Storage device 64 may comprise a computer-readable, machine-readable, or processor-readable storage medium that comprises instructions that cause one or more processors, e.g., processor 66, to perform various functions. Storage device 64 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. In some examples, storage device 64 may comprise one or more of a non-transitory/tangible storage media, where the data stored in such media may or may not change (e.g., ROM, RAM).

Instructions stored in memory 64 may be downloaded by a user via a network or may be preprogrammed within computing device 40. Instructions stored in memory 64 may be executed by processor 66 in response to a user interacting with computing device 40 to execute applications. Alternatively or additionally, instructions may also be executed by processor 66 when a user turns on computing device 40.

Processor 66 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 66, in this disclosure, may be embodied as software, firmware, hardware or any combination thereof.

User interface 72 allows a user of computing device 40 to interact with computing device 40. Examples of user interface 72 include a keypad embedded on computing device 40, a keyboard, a mouse, a roller ball, buttons, or other embedded or external devices that allow a user to interact with computing device 40. In some examples, user interface 72 may include a microphone to allow a user to provide voice commands. Additionally or alternatively, user interface 72 may receive video data from camera 44 and video source 56.

User interface 72 may generate a graphical user interface that allows a user to initiate commands. For example, according to some aspects of the disclosure, user interface 72 includes a user interface controller that generates a graphical user interface that is displayed on display 76. User interface controller 74 may receive video data from camera 44 and video source 56 and use the video data to generate or control the graphical user interface.

Display 76 may include one of a variety of display devices such as a liquid crystal display (LCD), an e-ink display, a cathode ray tube (CRT), a plasma display, an organic light emitting diode (OLED) display, or another type of display. Display 76 presents the content generated by computing device 40 to a user of computing device 40. For example, display 76 may present applications executed on computing device 40 such as a gesture tracking application or other functions that may need to be presented to the user.

According to aspects of the disclosure, user interface 72 also includes fingertip tracking module 78 for enabling touchless interaction between a user and computing device 40. For example, fingertip tracking module 78 works in conjunction with camera 44 to track the motion of a user's hand, hands, or fingers in one or more frames of video data captured by camera 44. Fingertip tracking module 78 also interprets that motion as gestures for interacting with computing device 40. Fingertip tracking module 78 may allow for visualization tools as well as for moving virtual objects generated by user interface 72 on display 76. In some examples, fingertip tracking module 78 identifies gestures that allows the user to take a computing action such as drag, cut, copy, paste, open file, close file, new window, browse, activate speech recognition, etc.

In some examples, fingertip tracking module 78 identifies the skin tone of user 20 and segments the skin areas of a frame of video data captured by camera 44 from the other portions of the frame. Fingertip tracking module 78 then identifies user's face and hand, and segments the face and hand from the rest of the frame. Fingertip tracking module 78 then removes the face from consideration, leaving only the hand for analysis. Fingertip tracking module 78 then designates fingertips of the hand for tracking. In some examples, fingertip tracking module 78 repeats the processes for each frame in a succession of frames and tracks the motion of fingertips throughout the succession of frames. For example, fingertip tracking module 78 determines the positions of fingertips for each frame and determines the difference in positions of fingertips in successive frames.

FIGS. 3A-3D illustrate segmenting a hand of a user with an image processing device, which may be image processing device 24 shown in FIG. 1, or computing device 40 of FIG. 2. For purposes of illustration only, FIGS. 3A-3D are described with respect to the example computing device 40 of FIG. 2, although various other systems and/or devices may be utilized to implement or perform the process shown in FIGS. 3A-3D. FIGS. 3A-3D represent a frame of video data captured by camera 44 for processing by computing device 40. According to some aspects of the disclosure, computing device 40 identifies user's face 92 and hand 94 in the video frame and segments the face and hand from the rest of the frame. Computing device 40 then removes the face from consideration, leaving only the hand for analysis.

Figure 3A:
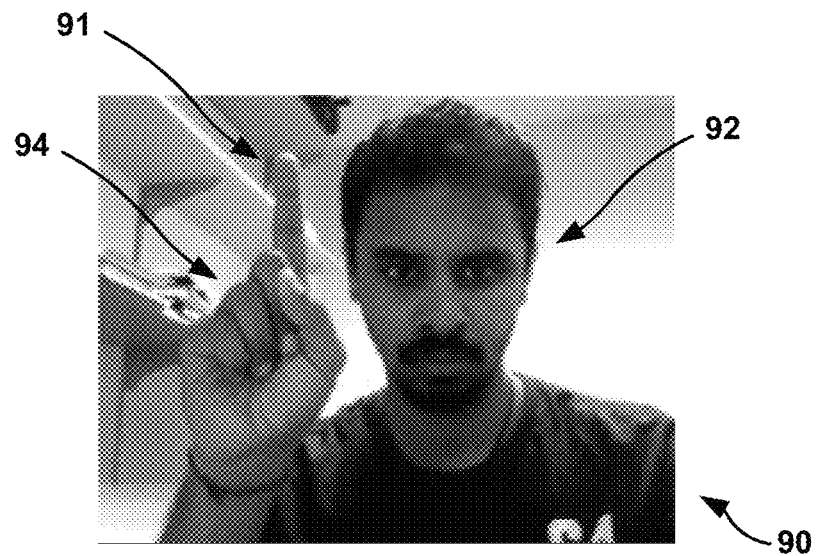
FIG. 3A is a diagram illustrating segmenting an image of a hand of a user with an image processing device, according to aspects of the present disclosure.

As shown in FIG. 3A, user 90 is holding up a single finger 91 of user's hand 94. The user's face 92 is also visible in the frame. According to some aspects of the disclosure, computing device 40 identifies the skin tone of the user and segments the face 92 and hand 94 from the rest of the frame. In an example, computing device 40 compares pixels values of the frame to one or more histograms containing pixel values of known skin tones. For example, computing device 40 compares pixel values of the frame to pixel values of histograms composed in one or more of a variety of different color spaces (e.g., RGB, HSV, or other color spaces). Computing device 40 segments the skin of user 90 from the rest of the frame by determining a difference between pixel values of the frame and values of a histogram structure, and comparing the difference to a threshold. If the difference is less than the threshold, that portion of the frame is segmented as skin.

Alternatively or additionally, computing device 40 may rely on user 90 to complete a training process that allows computing device 40 to differentiate the user's skin tone from the rest of the frame. For example, computing device 40 may include a training process that prompts user 90 to train computing device 40 to identify the user's skin tone. During the training process, computing device 40 may prompt user 90 to position the user's hand 94 in a predetermined area, so that computing device 40 can identify the object in the area as the hand 94. The computing device 40 then associates the pixel values in the predetermined area with the skin tone of user 90. The training process may be a one time, initial procedure. For example, user 90 may be prompted to complete the training process upon powering up computing device 40. In other examples, computing device 40 may prompt user to complete the training process at regular intervals, or if computing device 40 is later unable to identify user's skin tone.

To complete the training process, computing device 40 may display a boxed area on display 76 of computing device 40 and prompt user 90 to position user's hand 94 in the boxed area. Using camera 44 to capture user 90 and display user 90 on display 76, user 90 can position user's hand 94 in the boxed area. Computing device 40 then associates the pixel values in the predetermined area with the skin tone of user 90. Computing device 40 may provide feedback to user 90. For example, computing device 40 may indicate that training has started, training is ongoing, training has successfully been completed, or training has failed. If the training process fails to identify the user's skin tone, computing device 40 may prompt user 90 to initiate the training process again.

According to other aspects of the disclosure, computing device 40 may use face detection or face recognition to determine the user's skin tone. For example, computing device 40 may first identify the face of user 90 in order to differentiate the user's skin tone from the rest of the frame. Computing device 40 may utilize an image processing library, such as the OpenCV library or other image processing tool to detect the face. Computing device 40 may iteratively compare portions of the frame to a library of known facial features to identify the face in the frame. After identifying the face of the user's face 92, computing device 40 can associate the pixel values in the face with the skin tone of user 90. Accordingly, computing device 40 can segment the face 92 and hand 94 of user 90 (i.e., the skin regions of the user 90) from the rest of the frame, assuming that the skin tone of the hand is similar to that of the face.

In some examples, computing device 40 updates the skin tone of the user when processing successive frames. For example, computing device 40 identifies the face of the user and correlates the skin portions of the face to the skin tone of the user for every frame, or after a number of frames (e.g., after every 3 frames, after every 10 frames, after every 30 frames). Dynamically updating the skin tone of the user 90 using face detection may allow for computing device 40 to adapt to changing environment and lighting changes. For example, the skin tone of the user 90 as perceived by computing device 40 using camera 44 may change with changing lighting conditions (e.g., bright lighting making the skin appear lighter), which may make it harder for computing device 40 to identify and track the skin tone of the user 90 using a static skin tone template. By associating overall the skin tone of the user with the skin of the user's face, computing device 40 can alter the skin tone of the user with changing environment and lighting conditions.

Figure 3B:
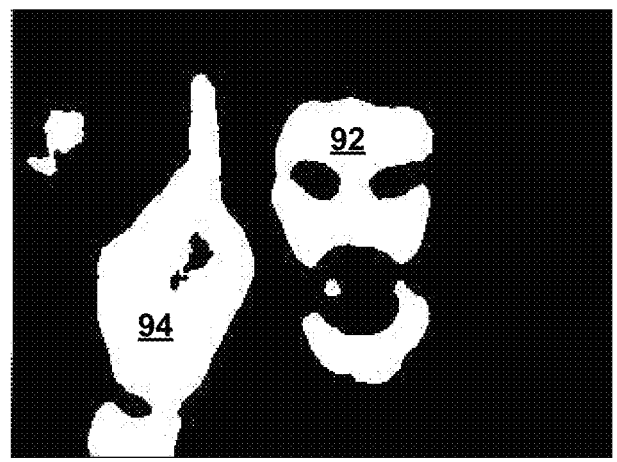
FIG. 3B is another diagram illustrating segmenting an image of a hand of a user with an image processing device, according to aspects of the present disclosure.

FIG. 3B illustrates a mask of hand 94 and face 92 of the user 90 shown in FIG. 3A. According to some aspects of the disclosure, the mask shown in FIG. 3B is generated by segmenting the skin region of user 90 from the rest of the frame. For example, after computing device 40 identifies the skin tone of user 90, computing device 40 segments the skin areas of the frame from the rest of the frame. In some examples, computing device 40 sets a skin tone threshold value based on the user's identified skin tone (e.g., as described with respect to FIG. 3A). For example, computing device 40 segments the skin of user 90 from the rest of the frame by determining a difference between pixel values of the frame and a value set according to the face of the user. Computing device 40 then compares the difference to a threshold. If the difference is less than the tolerated threshold, that portion of the frame is segmented as skin. In some examples, a median filter may be applied to the segmented skin mask. The median filter helps to remove noise from the mask, which reduces the amount of non-skin areas of the frame from being segmented as skin areas of the frame.

Figure 3C:
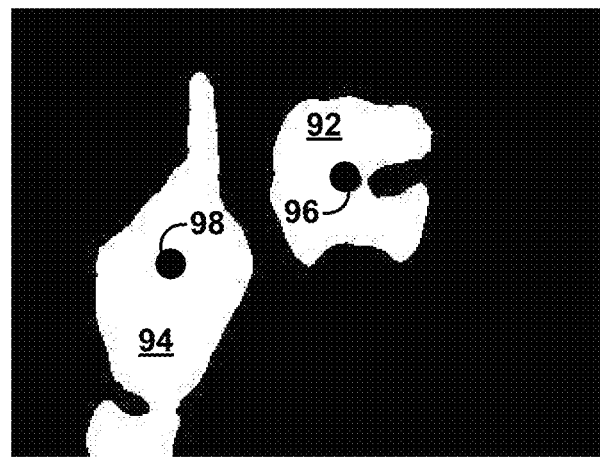
FIG. 3C is yet another diagram illustrating segmenting an image of a hand of a user with an image processing device, according to aspects of the present disclosure.

FIG. 3C illustrates a processed mask of the hand and face of the user shown in FIG. 3B, according to aspects of the present disclosure. For example, after skin segmentation, the mask typically includes two large regions corresponding to face 92 and hand 94 of user 90. In order to ensure that background regions (e.g., regions of the frame not attributable to user 90) are not mistakenly included in the mask, computing device 40 may identify two primary areas as skin areas, and remove any other portions of the mask that were segmented as skin. According to some examples, computing device 40 implements a blob extraction process (e.g., a blob extraction process using an OpenCV blob extraction library) to identify the two largest blobs that correspond to face 92 and hand 94 of user 90. In some other examples, computing device 40 may implement a blob extraction process to identify more blobs, for example, if computing device 40 is identifying and segmenting two hands of user 90 for tracking, or hands of multiple users.

Prior to segmentation of hand 94, computing device 40 may implement a sized-based elimination process to remove portions of the mask that do not have a high likelihood of belonging to the face 92 to hand 94 of user. For example, computing device 40 may include a blob size threshold and remove blobs that are smaller than the threshold size. In the example shown in FIG. 3C, computing device 40 has identified center 96 of face 92 and center 98 of hand 94.

Figure 3D:
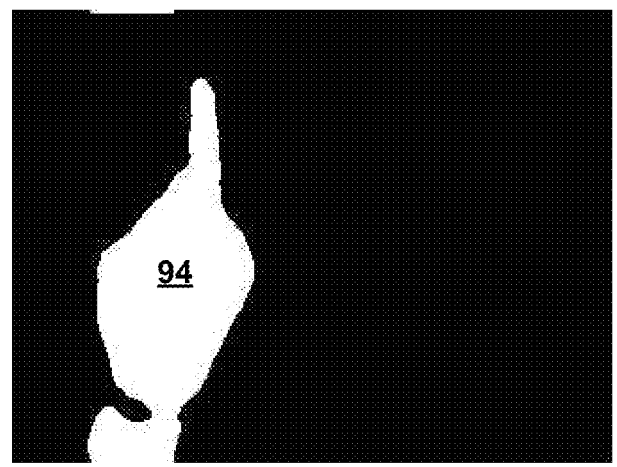
FIG. 3D is yet another diagram illustrating segmenting an image of a hand of a user with an image processing device, according to aspects of the present disclosure.

FIG. 3D illustrates segmentation of hand 94 of the user 90 shown in FIG. 3C, according to aspects of the present disclosure. After segmenting the two main areas of the mask shown in FIG. 3C, computing device 40 eliminates face 92 from consideration, leaving only hand 94. According to some aspects of the disclosure, computing device 40 implements a face detection process to remove face 92 from consideration. Computing device 40 may utilize an image processing library, such as the OpenCV library or other image processing tool to detect the face. Computing device 40 may iteratively compare portions of the frame to a library of known facial features to identify the face in the frame. Computing device 40 then compares the location of the identified face in the frame to the location of the segmented blobs included in the mask. In some examples, computing device 40 determines coordinates associated with the center of the identified face and determines coordinates associated with centers 96 and 98 of the segmented blobs. Computing device 40 then removes the segmented blob with the coordinate more closely aligned to the coordinates of the center of the face. After computing device 40 has removed substantially everything from consideration but hand 94 of user 90, computing device 40 can more accurately identify and track the fingertips (and thumb) of user 90.

Figure 4:
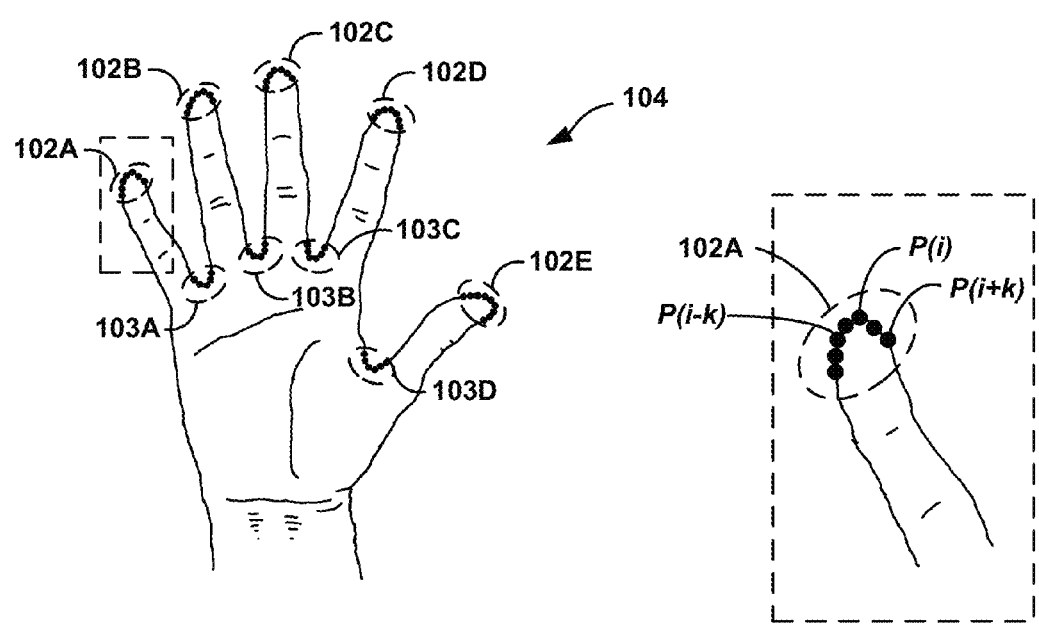
FIG. 4 is a diagram illustrating generating a curvature value along points associated with the contour of a hand using an image processing device, according to aspects of the present disclosure.

FIG. 4 illustrates generating curvature values along points associated with the contour of a hand 104 using an image processing device, which may be image processing device 24 shown in FIG. 1, or computing device 40 of FIG. 2. For purposes of illustration only, FIG. 4 is described with respect to computing device 40 of FIG. 2, although various other systems and/or devices may be utilized to implement or perform the process shown in FIG. 4.

According to some aspects of the disclosure, computing device 40 generates curvature values associated with points along the contour of hand 104 to aid in identifying fingertips of a user. For example, computing device 40 generates fingertip peak points (e.g., points associated with fingertips) 102A-102E (collectively fingertip points 102) and valley points (e.g., points associated with valleys between fingertips) 103A-103D (collectively 103). Typically the most curved portions of the contour of a person's hand are located at the tops of the fingertips and between the fingers (e.g., webbing between the fingers). Accordingly, identifying points having a high curvature value along the contour of hand 104 aids computing device 40 in identifying the fingertips of hand 100. Computing device 40 can also identify the fingertip points 102 of the fingertips as "peaks" of the fingertips and the webbing, or valley points 103 between the fingers as "valleys" of the fingertips, as described in more detail below. Computing device 40 can also verify that valley points 103 are positioned between two groups of peak points 102.

According to some aspects of the disclosure, computing device 40 may generate a curvature value for points (e.g., peak points 102 and valley points 103) along contour of hand 104 by comparing points that precede and succeed a given point. For example, computing device 40 may generate a curvature value of a given point by generating the dot product of vectors P(i)P(i−k) and P(i)P(i+k) using a K-curvature algorithm, e.g., as represented in Equation (1) below:

$$C_k(P_i) = \frac{\overrightarrow{P(i)P(i-k)} \cdot \overrightarrow{P(i)P(i+k)}}{\|\overrightarrow{P(i)P(i-k)}\| \cdot \|\overrightarrow{P(i)P(i+k)}\|} \quad (1)$$

where P(i) is the ith point on the contour of hand 104, P(i−k) is the kth preceding point of P(i) and P(i+k) is the kth succeeding point of P(i). For example, in the group of peak points 102A, a current point under consideration P(i) may be compared to a point P(i−k) that precedes the point P(i) and a point P(i+k) that succeeds the point P(i), as shown in FIG. 4. The curvature value $C_k(P_i)$ generated with the K-curvature algorithm produces a numerical value that is representative of a curvature associated with a given point. In some examples, a relatively large curvature value is indicative of a high amount of curvature surrounding the given point.

Computing device 40, accordingly, can identify peaks and valleys in areas in which points have relatively large curvature values. For example, while FIG. 4 shows groups of peak points 102 and valley points 103, according to some aspects of the disclosure, computing device 40 generates a curvature value for every point along the contour of hand 104. Computing device 40 identifies points along the contour of hand 104 as peak points 102 or valley points 103 if the curvature value associated with the point under consideration exceeds a predefined curvature threshold.

In some examples, computing device 40 generates multiple curvature values using the K-curvature algorithm (as shown in Equation (1)) for the points along the contour of hand 104 by changing the value of scale variable k. Using a range of values for the variable k may help to account for varying scale associated with hand 104 moving nearer to and farther from camera 44 of computing device 40. For example, hand 104 appears relatively larger when positioned near camera 44, and relatively smaller when positioned farther from camera 44. Accordingly, the curvature value of a point under consideration will be different depending how near or far hand 104 is with respect to camera 44. According to some aspects of the disclosure, computing device 40 generates 20 separate curvature values, with values of k ranging from 5 to 25 to account for a varying position of hand 104 with respect to camera 44. By implementing a plurality of values of variable k for each point under consideration, computing device 40 can identify peak points 102 and valley points 103 at various scales. According to some aspects of the disclosure, computing device 40 generates multiple curvature values using multiple values of variable k, and if any of the curvature values exceed the curvature value threshold, the point is identified as a peak point 102 or valley point 103.

As described above, computing device 40 may classify points along the contour of hand 104 as peak points 102 or valley points 103. In some examples, computing device 40 makes the distinction between peak points 102 and valley points 103 by generating a cross product of the vectors used for the K-curvature algorithm described above (e.g., vectors P(i)P(i−k) and P(i)P(i+k)). Computing device 40 then classifies points with a curvature value that exceeds a curvature value threshold as a peak point 102 or a valley point 103 based on the sign of the z-component of the cross product. For example, the cross product of the vectors used for the K-curvature algorithm produces the normal to the two vectors, and a negative z-component indicates that the point is a valley point, while a positive z-component indicates that the point is a peak point.

Computing device 40 may use the peak/valley classification to retain points as fingertip candidate points, or remove points from being considered as fingertip candidate points. For example, computing device 40 may remove valley points 103 from being considered as candidate fingertips, despite valley points 103 having a high degree of curvature. Additionally or alternatively, computing device 40 may use the valley points 103 to help distinguish between two groups of peak points 102. For example, computing device 40 may verify that two groups of peak points 102D and 102C are in fact two distinct groups of points by recognizing that valley points 103C are positioned between them.

Figure 5A:
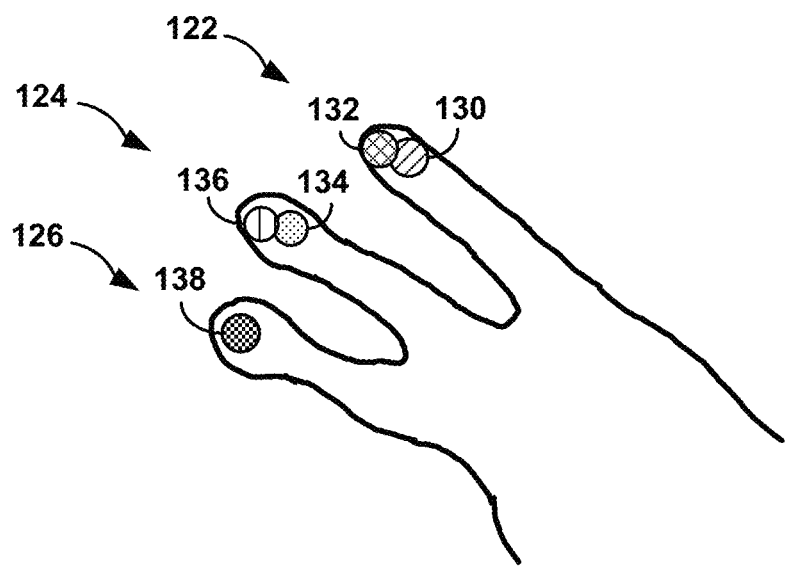
FIG. 5A is a diagram illustrating clustering and merging candidate fingertip points of three fingers using an image processing device, according to aspects of the present disclosure.
Figure 5B:
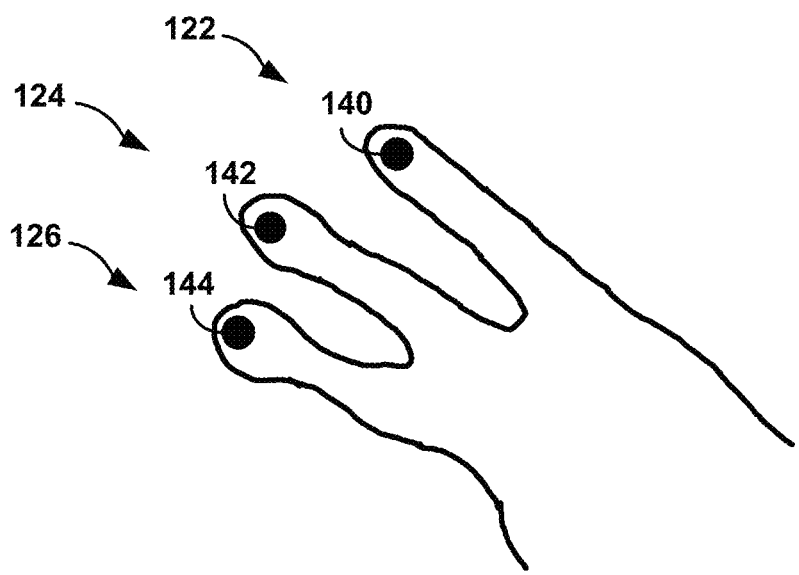
FIG. 5B is another diagram illustrating clustering and merging candidate fingertip points of three fingers using an image processing device, according to aspects of the present disclosure.

FIG. 5A and FIG. 5B illustrate clustering and merging candidate fingertip points of three fingers 122, 124, and 126 using an image processing device, which may be image processing system 24 shown in FIG. 1, or computing device 40 of FIG. 2. For purposes of illustration only, FIGS. 5A and 5B are described with respect to computing device 40 of FIG. 2, although various other systems and/or devices may be utilized to implement or perform the process shown in FIGS. 5A and 5B.

FIG. 5A illustrates three fingers 122-126 having fingertip candidate clusters 130, 132, 134, 136, and 138. According to some aspects of the disclosure, after identifying candidate fingertip points, such as points 100 shown in FIG. 4, computing device 40 narrows the number of candidate fingertips to a predefined number by grouping the points into candidate fingertip clusters. As shown in FIG. 5A, according to some examples, computing device 40 identifies five clusters 130-138. The predefined number of candidate fingertip clusters, however, may depend on the application of computing device 40. For example, if computing device 40 is incorporated into a mobile device, such as a mobile telephone, and a single user is intended to interact with computing device 40 using all five fingers of a hand, computing device 40 may identify five candidate fingertip clusters (e.g., one cluster for each finger). Alternatively, if computing device 40 is configured to allow a user to interact with computing device 40 using a fewer number of fingers (e.g., three), computing device 40 may be configured to identify three candidate fingertip clusters. In another example, if computing device 40 is incorporated into a device that may be used simultaneously by multiple users (e.g., a gaming console, a video conferencing system, and the like), computing device 40 may be configured to identify more candidate fingertip clusters (e.g., 10 or 15).

According to some aspects of the disclosure, computing device 40 groups candidate fingertip points (e.g., such as points 100 shown in FIG. 4) into clusters based on the proximity of the points to each other. For example, computing device 40 may implement a K-means algorithm to group a number of candidate fingertip points into a predefined number of candidate fingertip clusters. According to some aspects, a data set of N points (e.g., $\{x_1, x_2, x_3, \ldots, x_N\}$ that correspond to the points of curvature described above) is partitioned into a set of K clusters using a K-means algorithm, as shown in Equation (2) below:

$$C = \sum_{n=1}^{N} \sum_{k=1}^{K} I_{nk} \|x_n - \mu_k\|^2 \quad (2)$$

where K is the predefined number of clusters and $\mu_k$ is the center of the kth cluster. For each data point $x_n$, then, the K-means algorithm considers a corresponding set of binary indicator variables $I_{nk} \in \{0,1\}$, where $k=1, \ldots, K$, which indicates the particular K clusters to which data point $x_n$ is assigned. For example, if data point $x_n$ is assigned to cluster k, then $I_{nk}=1$, and $I_{nj}=0$ for $j \neq k$. Computing device 40 assigns the nth data point to the closest cluster center. According to some aspects, computing device 40 assigns the data points according to the relationship set forth in below:

$I_{nk}=1$ if $k=\arg\min_j \|x_n - \mu_j\|^2$ $I_{nk}=0$ for all other values

Computing device 40 can then identify the location of cluster centers using Equation (3) below:

$$\mu_k = \frac{\sum_n I_{nk} x_n}{\sum_n I_{nk}} \quad (3)$$

Data points $x_n$ are labeled based on their proximity to the cluster centers. In the example shown in FIG. 5A, computing device 40 identifies five fingertip candidate clusters 130-138 using a K variable set to five. In other examples, computing device 40 may identify more or fewer candidate fingertip clusters, as described above, using an alternative K variable.

FIG. 5B illustrates pruning five candidate fingertip clusters shown in FIG. 5A to three candidate fingertips 140, 142, and 144 by merging candidate fingertip clusters using an image processing device, which may be image processing system 24 shown in FIG. 1, or computing device 40 of FIG. 2. For example, according to some aspects of the disclosure, computing device 40 prunes candidate fingertip clusters from an initial, predefined number (e.g., a predefined number K described with respect to FIG. 5A) to a number representative of the actual fingertips that are present. In some examples, computing device 40 prunes candidate fingertip clusters by merging, or combining the candidate fingertip clusters based on the proximity of the clusters to each other. For example, merging candidate fingertip clusters includes combining multiple candidate fingertip clusters than are identifiable by computing device 40 into a single candidate fingertip cluster that is identifiable by computing device 40. Doing so prunes, or reduces the overall number of candidate fingertip clusters that are identified by computing device 40.

In the example shown in FIG. 5B, computing device 40 prunes the five fingertip candidate clusters 130-138 (e.g., as shown in FIG. 5A) to three candidate fingertip clusters 140, 142, and 144 based on the proximity of the clusters 130-138 to each other. For example, according to some aspects of the disclosure, computing device 40 includes a candidate fingertip distance threshold that is used to merge candidate fingertip clusters. The candidate fingertip distance threshold is set to ensure that only the actual number of fingertips present in a given frame are identified and tracked by computing device 40. According to some aspects, the candidate fingertip distance threshold is based on the width of the segmented object (e.g., the base of the hand of the fingertips being tracked). For example, computing device 40 identifies a width of the object in the frame and divides the width by an initial number of anticipated fingertips. In an example, computing device 40 may set the candidate fingertip distance threshold by dividing the width of the object in the frame by five. In other examples, computing device 40 may utilize another empirically derived candidate fingertip distance threshold. After pruning the candidate fingertips clusters by merging the clusters, computing device 40 may designate the merged clusters 140-144 as fingertips for tracking.

Figure 6:
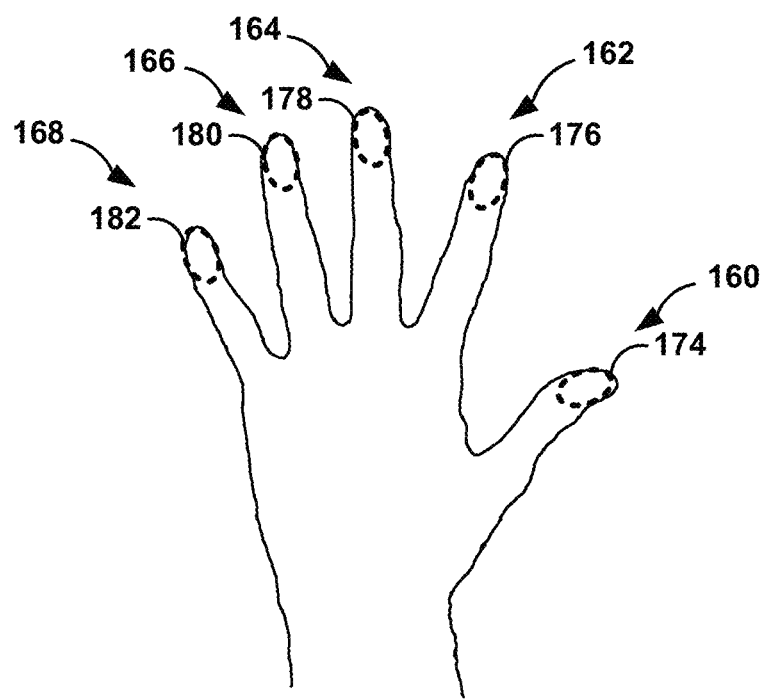
FIG. 6 is a diagram illustrating a hand with five fingers having ellipses fit to the fingertips by an image processing device, according to aspects of the present disclosure.

FIG. 6 illustrates a hand having five fingers 160, 162, 164, 166, and 168 having ellipses 174, 176, 178, 180, and 182 fit to the fingertips by an image processing device, which may be image processing system 24 shown in FIG. 1, or computing device 40 of FIG. 2. For purposes of illustration only, FIG. 6 is described with respect to computing device 40 of FIG. 2, although various other systems and/or devices may be utilized to implement or perform the process shown in FIG. 6.

According to some aspects of the disclosure, computing device 40 fits an elliptical shape to candidate fingertips, such as the merged clusters 140-144 shown in FIG. 5B, as a verification tool. For example, computing device 40 fits an elliptical shape to each candidate fingertip identified by computing device 40 in a given frame to ensure that the contour of the candidate fingertip fits the natural elliptical shape of most users' fingertips.

In some examples, computing device 40 fits ellipses 174-182 to identified candidate fingertip clusters, such as the merged candidate fingertip clusters 140-144 shown in FIG. 5B. For example, computing device 40 may verify that candidate fingertip clusters 140-144 follow the natural curved shape of a fingertip by applying ellipses 174-182 to the points that make up the clusters. Computing device 40 may apply ellipses 174-182 to the points that make up candidate fingertip clusters using a least squares approach. Computing device 40 may use a least squares algorithm to minimize the residual error produced by fitting the ellipses 174-182 to the points that make up the candidate fingertip clusters 140-144.

According to some aspects, computing device 40 utilizes the ellipses 174-182 to aid in tracking the fingertips. For example, after the ellipses 174-182 have been fit to the candidate fingertip clusters 140-144, computing device 40 tracks the position of the ellipses 174-182 between frames. Computing device 40 may be able to more efficiently track ellipses 174-182 than candidate fingertip clusters 140-144.

Figure 7:
FIG. 7 is a diagram illustrating tracking a path of a fingertip of a user with an image processing system, according to aspects of the present disclosure.

FIG. 7 illustrates tracking a path 190 if a fingertip 192 of a user 194 with an image processing system, which may be image processing system 24 shown in FIG. 1, or computing device 40 of FIG. 2. For purposes of illustration only, FIG. 7 is described with respect to computing device 40 of FIG. 2, although various other systems and/or devices may be utilized to implement or perform the process shown in FIG. 7.

According to some aspects of the disclosure, computing device 40 tracks the motion of a user. More specifically, computing device 40 designates fingertips of the user for tracking, and tracks the motion of the designated fingertips. In some examples, computing device 40 recognizes a predefined pattern of motion, or gesture, by interpreting the relative positions of the user's fingertips. Computing device 40 may start tracking one or more of a user's fingertips automatically upon power on of computing device 40. In another example, a user may initiate tracking with computing device 40.

As shown in FIG. 7, according to some aspects of the disclosure, computing device 40 identifies and tracks fingertip 192 of user 194. For example, computing device 40 recognizes the single fingertip 192 and tracks the position of fingertip 192 between successive frames along path 190. Computing device 40 may recognize the single fingertip 192 as a gesture for interacting with computing device 40. For example, computing device 40 may recognize fingertip 192 as a prompt to initialize a drawing function that allows user 194 to draw shapes that computing device 40 interprets and displays on display 76. In other examples, computing device 40 may track more than one fingertip of user 194. Computing device 40 can also identify gestures made with the fingertips of the user 194, which can be used to interact with computing device 40 in a variety of ways. For example, the gestures can be displayed on display 76 as visualization tools. Alternatively or additionally, computing device 40 may complete a task upon recognizing a gesture. For example, user 94 can use gestures to drag, cut, copy, paste, open file, close file, open new window, browse, activate speech recognition, or interact in other ways with computing device 40 by performing gestures with their fingertips that are recognized by computing device 40.

According to some aspects of the disclosure, computing device 40 tracks the motion of a user in real-time between multiple frames. In one example, the process of designating and tracking fingertips shown in FIG. 7 can be performed using a 3.0 GHz central processing unit (CPU), and a USB 2.0 web camera with a resolution of 640×480. The camera does not need to be pre-calibrated, and an average of 17 frames per second can be processed. In this example, skin segmentation is completed in approximately 8.65 milliseconds (msec) (e.g., as shown and described with respect to FIGS. 3A-3B), hand segmentation is completed in approximately 24.2 msec (e.g., as shown and described with respect to FIGS. 3C-3D) and the fingertip designation is completed in approximately 28.4 msec (e.g., as shown and described with respect to FIGS. 4-6). Accordingly, the total time for designating fingertips, in the example provided, is approximately 61.25 msec.

Figure 8:
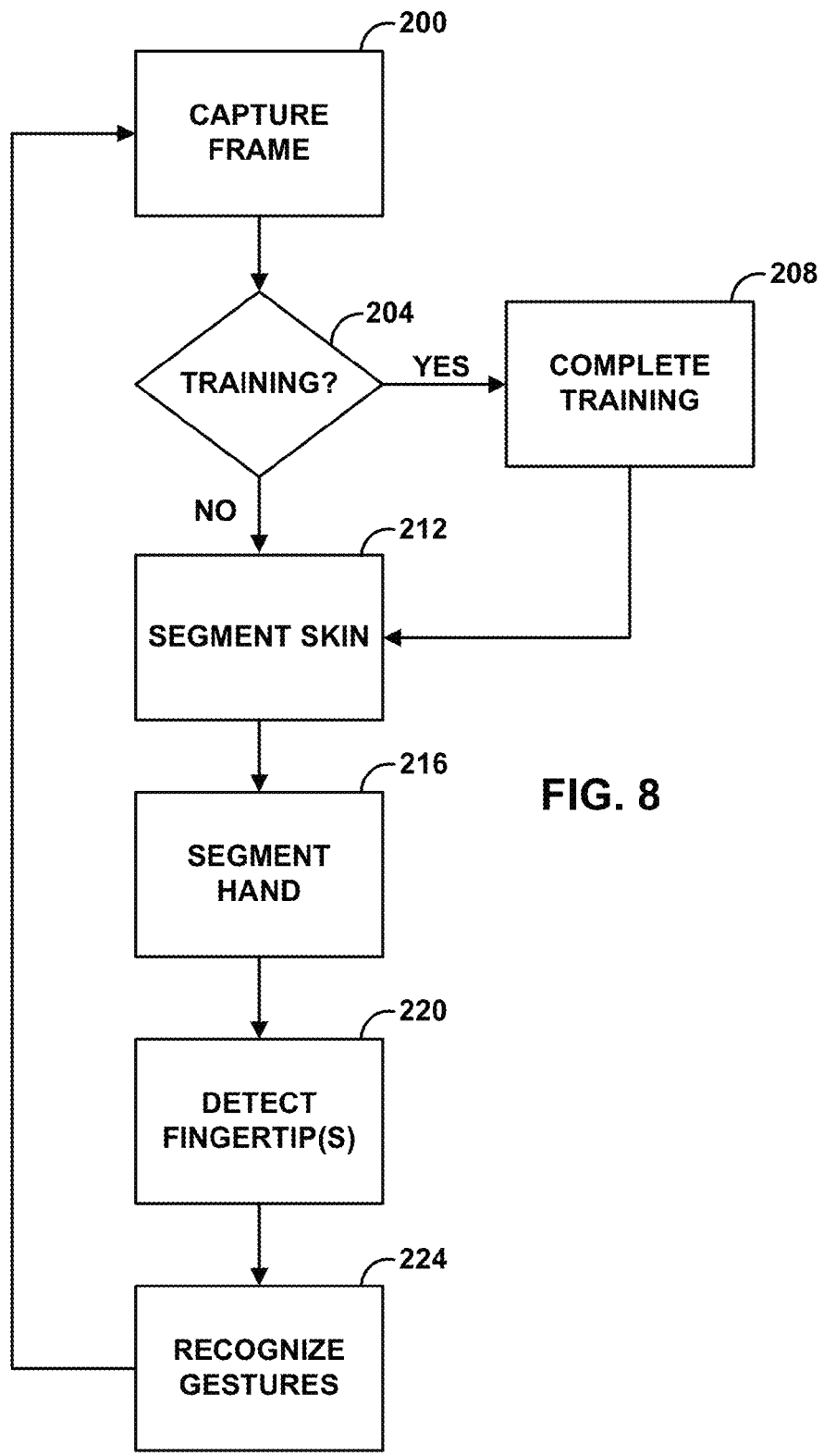
FIG. 8 is a flow chart illustrating a method for tracking gestures, according to aspects of the present disclosure.

FIG. 8 is a flow chart illustrating a method for tracking gestures. Although described with respect to computing device 40 of FIG. 2 for purposes of example, it should be understood that the method of FIG. 8 may be performed by any other processing unit. For example, the method of FIG. 8 may also be applied by image processing device 24 shown in FIG. 1, or another processing system.

Initially, camera 44 of computing device 40 captures a frame of video data (200). In some examples, the frame of video data is divided into a plurality of pixels, and each pixel has a pixel value (e.g., a red/green/blue (RGB) value, a hue, saturation, and lightness (HSL) value, a hue, saturation, and brightness (HSB) value, a YCbCr value, or other conventional pixel value). Computing device 40 then determines whether fingertip tracking module 78 needs to be trained to identify the skin tone of the user (204). Computing device 40 uses the training process to identify the skin tone of the user, which aids in identifying and tracking the motions of the user. In some examples, computing device 40 prompts a user to carry out an initial, one-time training process (e.g., a training process completed by user at power on). Alternatively or additionally, the training process may be carried out every "N" frames (e.g., every 3 frames, every 10 frames, every 30 frames) to periodically update the user's skin tone. In other examples, computing device 40 prompts the user to complete the training process if computing device 40 is not able to identify a user's skin tone in the frame using a previously identified skin tone. For example, computing device 40 may prompt the user to complete the training process if the user's skin tone has changed due to changing lighting or other environmental changes.

If training is required, computing device 40 completes a training process (208). According to some aspects of the disclosure, the user is given feedback regarding whether training is complete or ongoing. For example, during the training process computing device 40 prompts the user to position the user's hand in a predetermined area (e.g., a boxed area displayed on display 76), so that computing device 40 can identify the object in the area as the skin tone of the user. Computing device 40 determines whether there is enough skin of the user present in the boxed area (e.g., 80% of the predetermined area that includes a consistent tone). If there is enough of the user's skin in the boxed area, the outline of the boxed area changes color to indicate that computing device 40 is completing the training process. In some examples, the outline of the boxed area turns yellow to indicate to the user that computing device 40 is completing the training process. After training is complete, the outline of the boxed area may turn another color to indicate that the training process is complete. In some example, the outline of the boxed area turns green to indicate to the user that computing device 40 has completed the training process.

Computing device 40 may store the skin tone of the user in storage device 64. Computing device 40 may be configured to associate the user's skin tone with a variety of color spaces. For example, computing device 40 may store the RGB values associated with the user's skin tone, the HSL values associated with the user's skin tone, the HSB values associated with the user's skin tone, the YCbCr values associated with the user's skin tone, or other values associated with other color spaces.

After the training process (208), or if training is not needed ("No" branch of 204), computing device 40 segments the skin areas of a given frame from the rest of the frame (212). For example, computing device 40 may exclude all areas of the frame from consideration that do not match the user's skin tone.

According to some examples, computing device 40 utilizes a skin tone threshold to segment the skin of the user from the other areas for the frame. For example, computing device 40 calculates the difference between pixel values of the frame and the user's skin tone value (e.g., RGB value, HSV value, YUV value, or the like), and compares that difference of those values to the skin tone threshold. If the difference value exceeds the tolerated skin tone threshold, the pixel is removed from consideration. Computing device 40 may calculate the difference value on a per pixel basis or for predefined regions of the frame (e.g., by comparing an average pixel value of 4 pixels to the skin tone threshold).

In another example, computing device 40 segments the skin of the user from the rest of the frame using a color predicate. A color predicate is a two dimensional array of color values (e.g., color values based on multiple images of a human hand) that is pre-trained with images from an image database. The two dimensional array of color values (e.g., color values may be from a variety of color spaces including RGB, HSV, YUV, and the like) can then be compared to the frame. For example, computing device 40 may classify pixels as skin pixels using a color predicate having a two dimensional array of color values with rows and columns of hue and saturation values (e.g., in an implementation that utilizes the HSV color format). Certain positions in the color predicate are identified and labeled as being associated with the skin of the user. Accordingly, if hue and saturation values of a pixel under consideration are included in the color predicate as being skin, computing device 40 segments the pixel as skin. A color predicate may be predetermined and stored in computing device 40. In another example, a color predicate may be trained based on the training procedure discussed above with respect to step (208). A color predicate may also be based on a combination of both a predetermined color predicate and a color predicate generated by the training procedure 208. In still another example, as described with respect to FIG. 9 below, computing device 40 may identify the face of the user, and use skin of the face of the user to generate the color predicate.

In some examples, computing device 40 applies a filter to remove noise after segmenting the skin. For example, computing device 40 may apply a median filter to remove noise from the segmented skin.

Computing device 40 then segments the hand of the user (216). According to some aspects of the disclosure, computing device 40 segments the hand of the user to minimize processing time associated with designating and tracking the user's fingertips (e.g., by allowing for computing device 40 to process a smaller portion of the frame). Computing device 40 may also segment the hand of the user to avoid potential tracking errors. For example, a user's head is typically present in the frame and should be removed in order to avoid potential tracking errors, such as incorrectly identifying and tracking portions of the user's face. In addition, computing device 40 may erroneously identify some areas of the frame as a user's skin, which should be removed in order to avoid potential tracking errors.

According to some aspects of the disclosure, computing device 40 completes an initial size based elimination to assist in segmentation of the hand. Regarding the sized based elimination, the face and hand regions of the frame are typically the two largest skin-based regions of the frame. Accordingly, computing device 40 may have a predetermined minimum size threshold that must be exceeded prior to a certain area of pixels being retained as segmented skin pixels. For example, computing device 40 may discard areas of the frame that do not have enough contiguous identified skin pixels. Discarding smaller areas that have been identified as skin may help to ensure that spurious background regions that have been erroneously identified as skin by computing device 40 are not segmented. After smaller regions of identified skin have been discarded, the resulting frame contains only the face and hand of the user, if both are present.

Additionally or alternatively, computing device 40 segments the hand of the user via blob extraction and analysis. For example, the face and hand regions of the frame are typically the two largest skin-based regions of the frame. Accordingly, computing device 40 may identify the two largest regions of the frame (e.g., using an OpenCV blob extraction library) as the face and arm of the user. Computing device 40 can discard the large region corresponding to the face of the user, leaving only the segmented hand/arm of the user.

In some examples, computing device 40 removes the face from consideration using a face detection technique. For example, computing device 40 identifies a face of the user in the original frame. Computing device 40 may identify the face of the user in an unprocessed frame (e.g., the frame prior to identifying and segmenting the skin regions) using face detection or recognition method. In some examples, computing device 40 uses an OpenCV face detection or face recognition function to identify the face of the user. Computing device 40 then identifies the coordinates of the center point of the detected face, and compares that center point to the coordinates of the large segmented areas of the processed frame. Computing device 40 then removes the blob having coordinates that align with the center point of the detected face. After removing the blob corresponding to the face of the user, computing device 40 has segmented only the hand for further consideration.

While FIG. 8 refers to identifying and eliminating the face of the user from consideration, in some examples, the user's face may not be present in the frame. In such examples, computing device 40 may still complete the sized based elimination to remove spurious regions from the frame. If computing device 40 does not identify two large contiguous regions or does not detect a face, however, computing device 40 may assume that the face of the user is not present in the frame.

After segmenting the hand of the user from the rest of the frame, computing device 40 detects and designates fingertips of the user for tracking (220). In some examples, computing device 40 designates fingertips by identifying the contour of the segmented area (e.g., identified as the hand of the user) and identifying points of curvature along the contour of the hand, clustering the points into candidate fingertip clusters, merging candidate fingertip clusters based on proximity, and fitting ellipses to the merged candidate fingertip clusters. In other examples, computing device 40 may designate fingertips using more or fewer steps than those described with respect to FIG. 8. For example, computing device 40 may not carry out the ellipse fitting process to verify the merged candidate fingertips. According to some examples, computing device 40 designates fingertips of a user for tracking using the method described with respect to FIG. 10 below.

After computing device 40 has designated fingertips for a given frame, computing device 40 can track the fingertips between successive frames and recognize gestures (224). For example, after designating fingertips for a given frame, computing device 40 may determine the relative positions of the fingertips for the frame. Computing device 40 can then determine differences in the positions of the fingertips in successive frames. In this way, computing device 40 can track the relative positions of the fingertips for a succession of frames.

According to some aspects of the disclosure, computing device 40 is configured to recognize gestures that allow a user to interact with computing device 40. For example, computing device 40 is configured to identify predefined patterns of motion made with the user's fingertips by tracking the relative positions of the fingertips in one or more frames. The user can interact with the system by performing the predefined gestures. The user may be able to drag, cut, copy, paste, open file, close file, open new window, browse, activate speech recognition, or interact in other ways with the computing system by performing gestures with their fingertips that are recognized by the system.

In an example, computing device 40 may perform a zoom function (e.g., increase the size of content being displayed on display 76) when the user performs a pinching gesture with two fingertips (e.g., bringing a forefinger and thumb together in a pinching motion). In another example, computing device 40 may perform a drawing function (e.g., drawing shapes that are displayed on display 76) when the user extends a single fingertip, such as a forefinger. In another example, computing device 40 may perform a picture taking function (e.g., capturing an image with camera 44 or another camera of computing device 40) when the user performs curl or click gesture with a fingertip (e.g., curling a finger as if to press a button of a camera). In other examples, computing device user 20 may point a single finger, such as finger 32D, and draw with the fingertip such that the image drawn by user 20 is displayed by image processing device 24. In other examples, computing device 40 may be commanded according to hand postures of the user derived from the position and number of fingertips present. For example, computing device 40 may rotate content being displayed on display 76 of computing device 40 when a user extends the user's fingers and rotates the users hand. Other functions are also possible.

Figure 9:
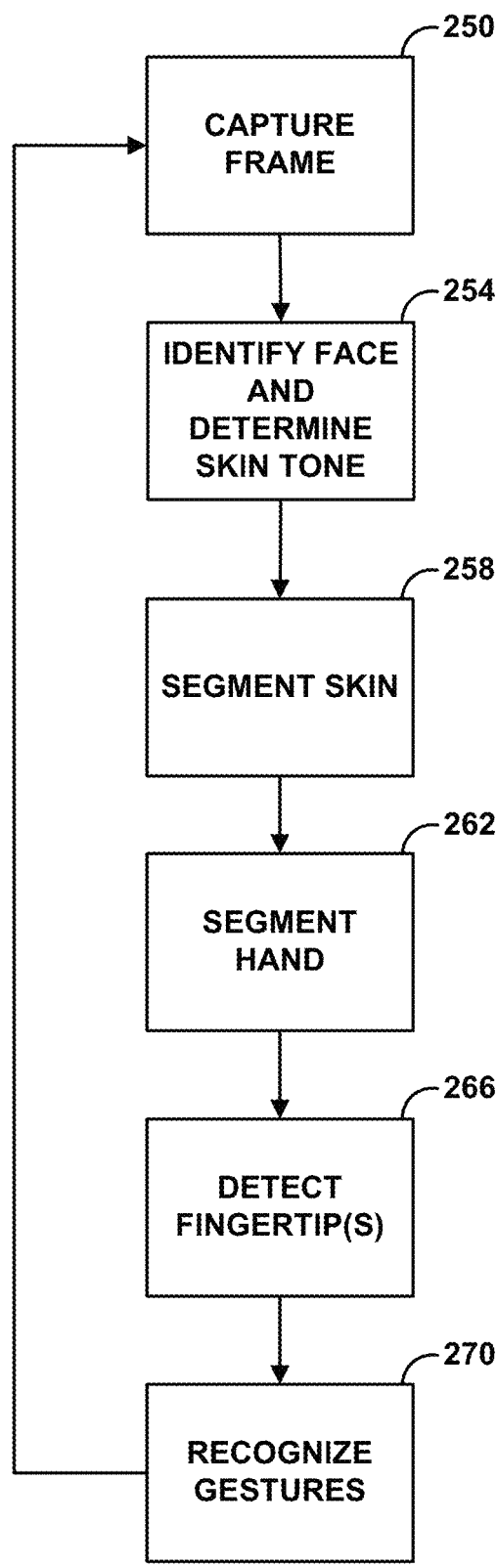
FIG. 9 is a flow chart illustrating another method for tracking gestures, according to aspects of the present disclosure.

FIG. 9 is a flow chart illustrating another method for tracking gestures. Although described with respect to computing device 40 of FIG. 2 for purposes of example, it should be understood that the method of FIG. 9 may be performed by any other processing unit. For example, the method of FIG. 9 may also be applied by image processing device 24 shown in FIG. 1, or another processing system.

Initially, camera 44 of computing device 40 captures a frame of video data (250). In some examples, the frame of video data is divided into a plurality of pixels, which each pixel having its own pixel value. Computing device 40 then identifies the face of the user in the frame, if the face of the user is present, and determines the skin tone of the user based on the face (254). For example, computing device 40 may implement a face detection tool to identify the face in the frame. Computing device 40 may utilize an image processing library, such as the OpenCV library or other image processing device to detect the face. For example, computing device 40 may iteratively compare portions of the frame to a library of known facial features to identify the face in the frame.

After identifying the face of the user, computing device 40 determines the skin tone of the user based on the skin areas of the face. In an example, computing device 40 may generate a color predicate for segmenting the skin of the user using the skin areas of the face. Determining the skin tone of the user aids computing device 40 in designating the fingertips of the user. Determining the skin tone of the user based on the face of the user may aid computing device 40 in accurately identifying the skin of the user in changing environments. For example, the skin tone of the user as perceived by computing device 40 using camera 44 may change with changing lighting conditions or other environmental conditions. Accordingly, it may be difficult for computing device 40 to accurately identify the skin tone of the user in all conditions using a static skin tone or static color predicate. By tying the skin tone of the user to the user's face, computing device 40 can dynamically alter the skin tone of the user with changing environment and lighting conditions.

According to some examples, if computing device 40 cannot identify a face in the frame, computing device 40 may default to another process to provide the skin tone of the user. For example, if computing device 40 cannot identify a face in the frame, computing device 40 may default to the method shown in FIG. 8.

As shown in FIG. 9, after determining the skin tone of the user, computing device 40 segments the user's skin from the rest of the frame (258), segments the user's hand (262), detects the user's fingertips (266), and recognizes gestures made by the user (270). According to some aspects of the disclosure, step 258 through step 270 of FIG. 9 may be carried out in the same manner as step 212 through step 224 show in FIG. 8.

Figure 10:
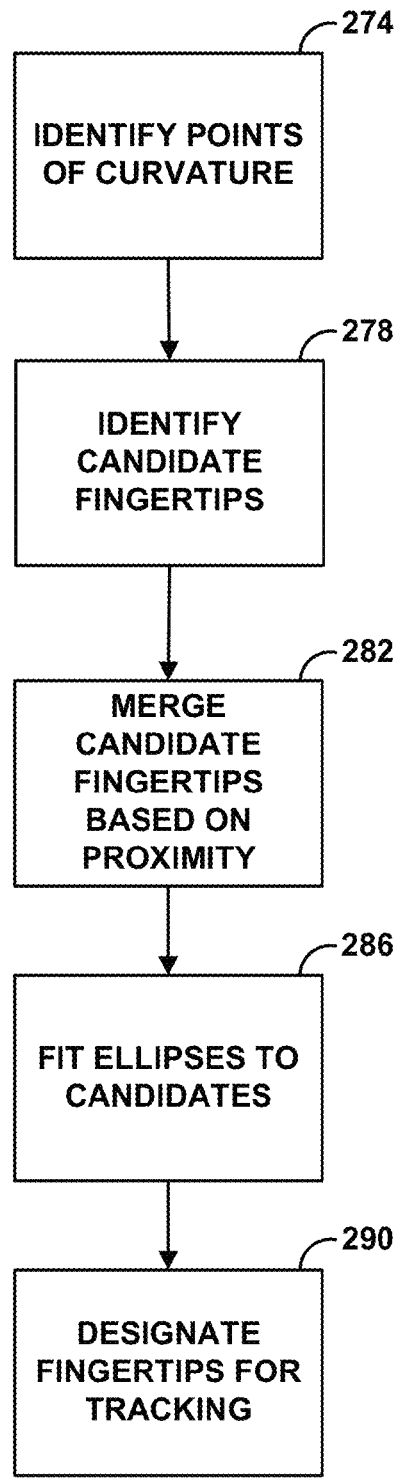
FIG. 10 is a flow chart illustrating a method for designating fingertips of a user, which can be used to identify gestures made by the user, according to aspects of the present disclosure.

FIG. 10 is a flow chart illustrating a method for designating fingertips of a user, which can be used to identify gestures made by the user. Although described with respect to computing device 40 of FIG. 2 for purposes of example, it should be understood that the method of FIG. 10 may be performed by any other processing unit. For example, the method of FIG. 10 may also be applied by image processing device 24 shown in FIG. 1, or another processing system. In some examples, the method of FIG. 10 may be carried out as a portion of a method of tracking gestures made by a user. For example, the method of FIG. 10 may be implemented in step 220 of FIG. 8, or step 266 of FIG. 9.

According to some aspects of the invention, computing device 40 designates fingertips by identifying points of curvature along the contour of the hand (274), clustering the points into candidate fingertip clusters (278), merging candidate fingertip clusters based on proximity (282), fitting ellipses to the merged candidate fingertip clusters (286), and designating the fingertips that have been fit with ellipses as fingertips for tracking (290). In other examples, computing device 40 may designate fingertips using more or fewer steps than those described with respect to FIG. 10. For example, computing device 40 may not carry out the ellipse fitting process to verify the merged candidate fingertips. Additionally, while the example shown in FIG. 10 shows some processes being carried out subsequently to other processes (e.g., step 286 being carried out after step 282), in other examples, the order in which the processes shown in FIG. 10 are carried out may be altered. For example, fitting ellipses to candidate fingertips (286) may be carried out immediately following the identification of points of curvature (274).

In some examples, computing device 40 identifies the points of curvature along the most curved portions of the contour of the hand, because typically the most curved portions of the hand are located at the fingertips and between the fingers (274). According to some aspects, computing device 40 generates one or more curvatures values for the curved portions of the hand using a K-curvature algorithm (e.g., as described with respect to FIG. 4).

Computing device 40 may also classify each point as a peak point or a valley point. Computing device 40 identifies the peak points at the tops of the fingertips of the hand, and valley points at the base of the fingers of the hand. Computing device 40 may use the peak/valley classification to retain points as fingertip candidate points, or remove points from being considered as fingertip candidate points. For example, computing device 40 may remove valley points from being considered as candidate fingertips, despite valley points having a high degree of curvature. Additionally or alternatively, computing device 40 may use the valley points to help distinguish between two distinct groups of peak points. For example, computing device 40 may verify that groups of peak points are separated by one or more valley points.

After identifying points of curvature, computing device 40 identifies candidate fingertips (278). In some examples, computing device 40 identifies candidate fingertips by clustering points of curvature into groups based on proximity. According to some aspects of the disclosure, computing device 40 implements a K-means algorithm to cluster the points into groups (e.g., as described with respect to FIG. 5A). For example, computing device 40 uses the K-means algorithm to partition the points into a predefined number of clusters. In some examples, computing device 40 initially partitions the points into five clusters, although a different number of initial clusters may be utilized in other examples.

According to some aspects of the disclosure, computing device 40 also merges clusters that computing device 40 identifies as being too close together (282). Merging clusters allows computing device 40 to prune the initial number of identified candidate fingertips into a number that is representative of the actual number of fingertips that are present in the frame. In some examples, computing device 40 compares a predefined distance threshold to the distance between clusters identified by the K-means algorithm. If the clusters are not sufficiently spaced, computing device 40 merges the clusters together (e.g., as described with respect to FIG. 5B).

In some examples, computing device 40 also fits ellipses to the merged candidate fingertips (286). Computing device 40 may fit ellipses to the merged candidate fingertips as a verification process. For example, computing device 40 may fit elliptical shapes to the merged candidate fingertips to verify that the candidate fingertips follow the natural half-elliptical contour of an actual fingertip. In some examples, computing device 40 fits the ellipses to the points that make up the designated fingertips using a least squares function. Computing device 40 may remove designated fingertips that are not sufficiently similar to the elliptical shape.

After fitting ellipses to the candidate fingertips, computing device 40 designates fingertips for tracking (290). For example, after designating fingertips for a given frame, computing device 40 may determine the relative positions of the fingertips for the frame. Computing device 40 can then determine differences in the positions of the fingertips in successive frames. In this way, computing device 40 can track the relative positions of the fingertips for a succession of frames.

According to some aspects of the disclosure, computing device 40 is configured to recognize gestures that allow a user to interact with computing device 40. For example, computing device 40 is configured to identify predefined patterns of motion made with the user's fingertips by tracking the relative positions of the fingertips in one or more frames. The user can interact with the system by performing the predefined gestures. The user may be able to drag, cut, copy, paste, open file, close file, open new window, browse, activate speech recognition, or interact in other ways with the computing system by performing gestures with their fingertips that are recognized by the system.

Certain processes described herein, with specific reference to those examples described with respect to FIG. 3A-FIG. 10, are described as being carried out generally by computing device 40. It should be understood, however, that certain functions ascribed to computing device 40 may be performed by a combination of one or more of the components and modules included in computing device 40. For example, according to some aspects of the disclosure, fingertip tracking module 78 may include instructions that cause processors 66 or processing components associated with user interface 72 to carry out the examples shown in FIG. 3A-FIG. 10.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A method for tracking one or more fingertips in video, comprising:
   generating, by one or more processors, a set of points associated with curvatures of a hand in a video frame;
   generating, by the one or more processors, a set of candidate fingertips in the video frame based on the set of points;
   merging, by the one or more processors, candidate fingertips of the set of candidate fingertips in the video frame based on an initial target number of candidate fingertips in the video frame and a relative proximity of the candidate fingertips to one another; and
   designating, by the one or more processors, one or more of the merged candidate fingertips as fingertips for tracking.

2. The method of claim 1, further comprising fitting an elliptical shape to one or more merged candidate fingertips, and tracking the relative position of the elliptical shape in a plurality of frames.

3. The method of claim 1, wherein generating the set of candidate fingertips includes identifying peak curvatures associated with the hand, and allowing the peak curvatures to remain in the set of candidate fingertips.

4. The method of claim 1, further comprising verifying the set of candidate fingertips by identifying valley curvatures associated with the hand, and removing the valley curvatures from being considered in the set of candidate fingertips.

5. The method of claim 1, wherein generating the set of points associated with curvatures of the hand includes generating a set of points using a K-curvature algorithm.

6. The method of claim 1, wherein merging candidate fingertips based on the initial target number of candidate fingertips includes setting the initial target number of candidate fingertips to five fingertips.

7. The method of claim 1, wherein merging candidate fingertips comprises merging the candidate fingertips using a K-means algorithm.

8. The method of claim 7, wherein the K-means algorithm is configured to merge the set of points into five candidate fingertips.

9. The method of claim 1, further comprising tracking the relative position of one or more designated fingertips in a plurality of frames, recognizing a gesture based on the tracking of the one or more designated fingertips, and performing a computing function based on the gesture.

10. A computer program product for tracking one or more fingertips in video comprising a non-transitory computer-readable storage medium having stored thereon instructions that, when executed, cause a processor to:
generate a set of points associated with curvatures of a hand in a video frame;
generate a set of candidate fingertips in the video frame based on the set of points;
merge candidate fingertips of the set of candidate fingertips in the video frame based on an initial target number of candidate fingertips in the video frame and a relative proximity of the candidate fingertips to one another; and
designate one or more of the merged candidate fingertips as fingertips for tracking.

11. The computer program product of claim 10, further comprising instructions causing the processor to fit an elliptical shape to one or more merged candidate fingertips, and tracking the relative position of the elliptical shape in a plurality of frames.

12. The computer program product of claim 10, wherein generating the set of candidate fingertips includes identifying peak curvatures associated with the hand, and allowing the peak curvatures to remain in the set of candidate fingertips.

13. The computer program product of claim 10, further comprising instructions causing the processor to verify the set of candidate fingertips by identifying valley curvatures associated with the hand, and removing the valley curvatures from being considered in the set of candidate fingertips.

14. The computer program product of claim 10, wherein generating the set of points associated with curvatures of the hand includes generating a set of points using a K-curvature algorithm.

15. The computer program product of claim 10, wherein merging candidate fingertips based on the initial target number of candidate fingertips includes setting the initial target number of candidate fingertips to five fingertips.

16. The computer program product of claim 10, wherein merging candidate fingertips comprises merging the candidate fingertips using a K-means algorithm.

17. The computer program product of claim 16, wherein the K-means algorithm is configured to merge the set of points into five candidate fingertips.

18. The computer program product of claim 10, further comprising instructions causing the processor to track the relative position of one or more designated fingertips in a plurality of frames, recognize a gesture based on the tracking of the one or more designated fingertips, and perform a function based on the gesture.

19. An apparatus for tracking one or more fingertips in video comprising:
a video camera configured to capture video frames;
a fingertip tracking module configured to:
generate a set of points associated with curvatures of a hand in the video frame;
generate a set of candidate fingertips in the video frame based on the set of points;
merge candidate fingertips of the set of candidate fingertips in the video frame based on an initial target number of candidate fingertips in the video frame and a relative proximity of the candidate fingertips to one another; and
designate one or more of the merged candidate fingertips as fingertips for tracking.

20. The apparatus of claim 19, wherein the fingertip tracking module is further configured to fit an elliptical shape to one or more merged candidate fingertips, and tracking the relative position of the elliptical shape in a plurality of frames.

21. The apparatus of claim 19, wherein generating the set of candidate fingertips includes identifying peak curvatures associated with the hand, and allowing the peak curvatures to remain in the set of candidate fingertips.

22. The apparatus of claim 19, wherein the fingertip tracking module is further configured to verify the set of candidate fingertips by identifying valley curvatures associated with the hand, and removing the valley curvatures from being considered in the set of candidate fingertips.

23. The apparatus of claim 19, wherein generating the set of points associated with curvatures of the hand includes generating a set of points using a K-curvature algorithm.

24. The apparatus of claim 19, wherein merging candidate fingertips based on the initial target number of candidate fingertips includes setting the initial target number of candidate fingertips to five fingertips.

25. The apparatus of claim 19, wherein merging candidate fingertips comprises merging the candidate fingertips using a K-means algorithm.

26. The apparatus of claim 25, wherein the K-means algorithm is configured to merge the set of points into five candidate fingertips.

27. The apparatus of claim 19, wherein the fingertip tracking module is further configured to track the relative position of one or more designated fingertips in a plurality of frames, recognize a gesture based on the tracking of the one or more designated fingertips, and perform a function based on the gesture.

28. An apparatus for tracking one or more fingertips in video comprising:
means for generating a set of points associated with curvatures of a hand in a video frame;
means for generating a set of candidate fingertips in the video frame based on the set of points;
means for merging candidate fingertips of the set of candidate fingertips in the video frame based on an initial target number of candidate fingertips in the video frame and a relative proximity of the candidate fingertips to one another; and means for designating one or more of the merged candidate fingertips as fingertips for tracking.

29. The apparatus of claim 28, further comprising a means for fitting an elliptical shape to one or more merged candidate fingertips, and tracking the relative position of the elliptical shape in a plurality of frames.

30. The apparatus of claim 28, wherein the means for generating the set of candidate fingertips further comprises a means for identifying peak curvatures associated with the hand, and allowing the peak curvatures to remain in the set of candidate fingertips.

31. The apparatus of claim 28, further comprising a means for verifying the set of candidate fingertips by identifying valley curvatures associated with the hand, and removing the valley curvatures from being considered in the set of candidate fingertips.

32. The apparatus of claim 28, wherein the means for generating the set of points associated with curvatures of the hand comprises a means for generating a set of points using a K-curvature algorithm.

33. The apparatus of claim 28, wherein the means for merging candidate fingertips based on the initial target number of candidate fingertips comprises a means for setting the initial target number of candidate fingertips to five fingertips.

34. The apparatus of claim 28, wherein the means for merging candidate fingertips comprises a means for merging the candidate fingertips using a K-means algorithm.

35. The apparatus of claim 34, wherein the means for using the K-means algorithm comprises a means for merging the set of points into five candidate fingertips.

36. The apparatus of claim 28, further comprising a means for tracking the relative position of one or more designated fingertips in a plurality of frames, recognizing a gesture based on the tracking of the one or more designated fingertips, and performing a function based on the gesture.

* * * * *